Figure 1:
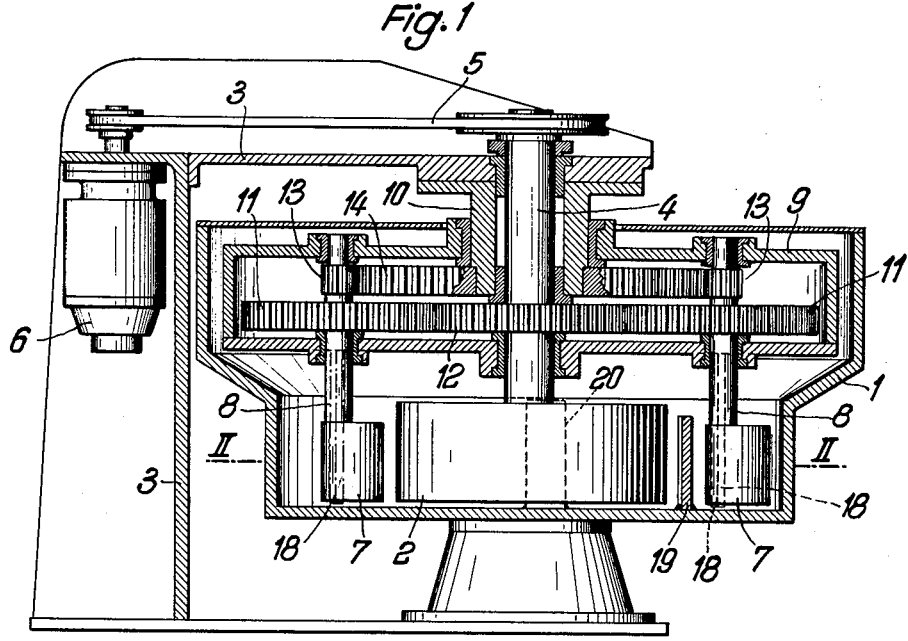

Oct. 1, 1957     E. A. REIFFEN     2,808,239

MIXING AND KNEADING MACHINE

Filed Aug. 20, 1954     4 Sheets-Sheet 1

Inventor:
ERNST ALFRED REIFFEN
By: Bailey, Stephens & Huettig
Attorneys

Oct. 1, 1957  E. A. REIFFEN  2,808,239
MIXING AND KNEADING MACHINE
Filed Aug. 20, 1954  4 Sheets-Sheet 2
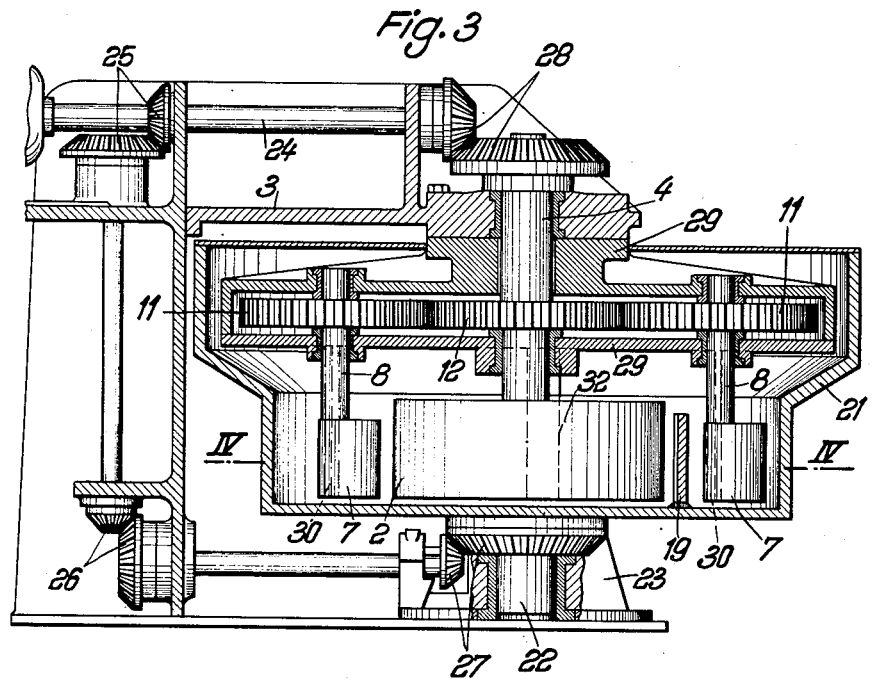
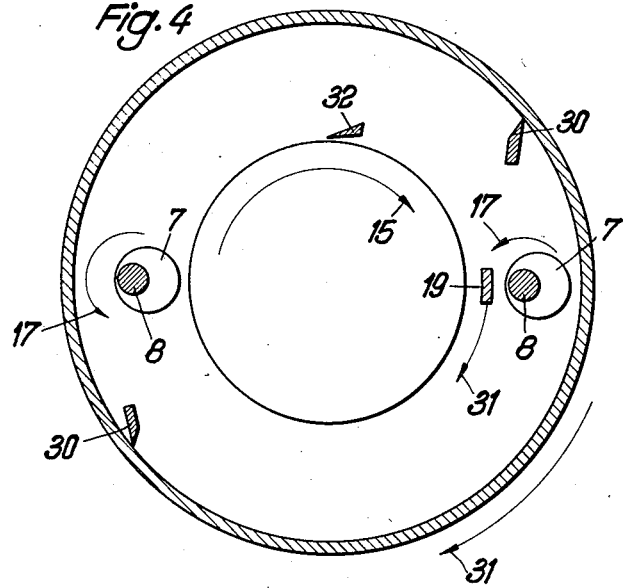
Inventor:
ERNST ALFRED REIFFEN
By: Bailey, Stephens & Huettig
Attorneys United States Patent Office 2,808,239
Patented Oct. 1, 1957

2,808,239

MIXING AND KNEADING MACHINE

Ernst Alfred Reiffen, Kassel-Wilhelmshoehe, Germany

Application August 20, 1954, Serial No. 451,248

Claims priority, application Germany September 15, 1953

13 Claims. (Cl. 259—102)

This invention concerns a mixing and kneading machine in which an especially effective and peculiar processing of the material to be treated takes place.

According to the present invention, in an annular space between a rotor disposed concentrically in a generally cylindrical mixing container and having its shaft parallel to the axis of the container and the wall of the vessel, kneading rolls are arranged which rotate in the direction opposite to and with a peripheral speed lower than that of the rotor, and a relative motion between the axis of each kneading roll and the container wall occurs in such a way that the radial position of the kneading roll with regard to the container wall constantly changes in the direction opposite to the rotation of the rotor.

According to one aspect of the invention, this relative motion can be produced in such a manner that the kneading rolls are caused to rotate through the annular space between rotor and container wall in the direction opposite to the rotation of the rotor and the container being stationary. According to one modification of the invention, the container rotates in the same sense as the rotor and the axes of the kneading rolls maintain their position and are not rotated through the annular space between rotor and container wall.

The rotor and the kneading rolls subject the material to be treated to continually reciprocating effects.

This reciprocal action is based on the fact that the kneading rolls feed the material to be treated from the peripheral zones of the container towards the rotor which, due to its higher peripheral speed, impresses on the material to be treated a motion again directed outwards.

In the zone of pressure building up between the kneading rolls and the rotor, the material to be treated is subjected to a kneading process whereby it is first compressed and then drawn apart again.

The material crowds together before the feed-in zone of the kneading rolls and leaves the feeding rolls at the rear with a differentiated speed, due to the higher speed of the rotor. There it enters a lee-side space formed more or less behind the kneading rolls, as seen in the direction of flow, and is impelled towards the container wall according to its consistency.

Figure 2:
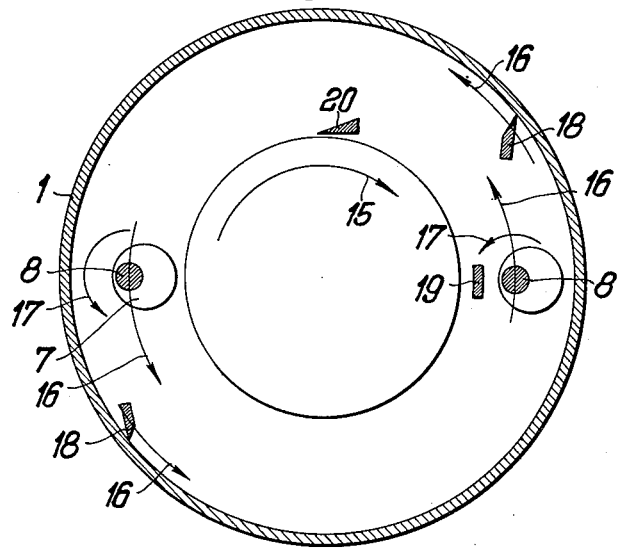
Figure 5:
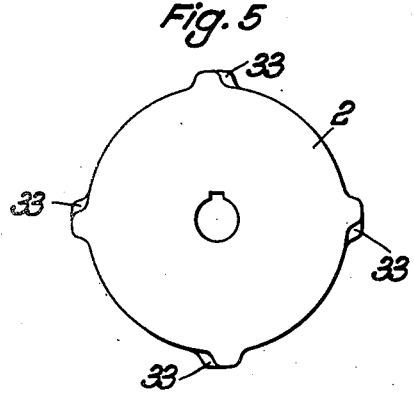
Figure 6:
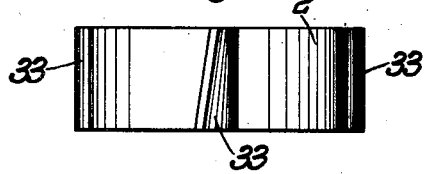
Figure 7:
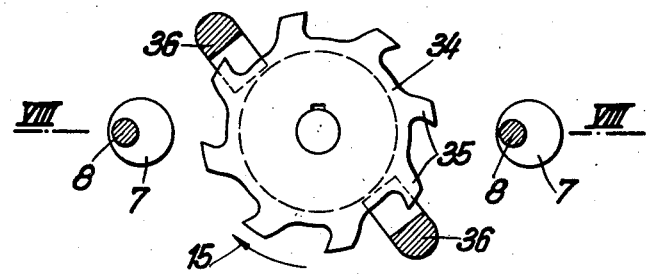
Figure 8:
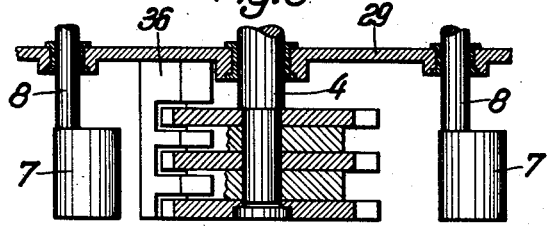
Figure 9:
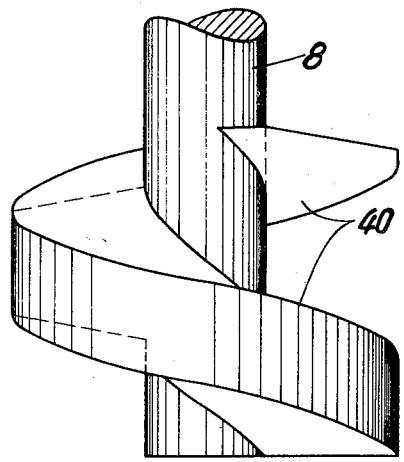
Figure 10:
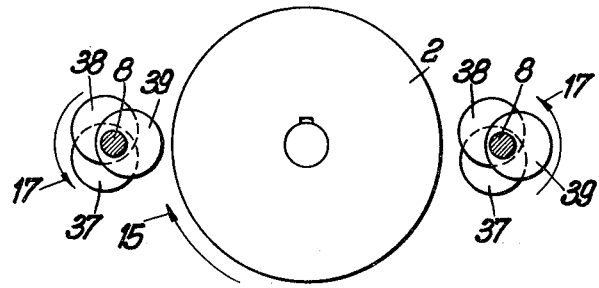
Figure 11:
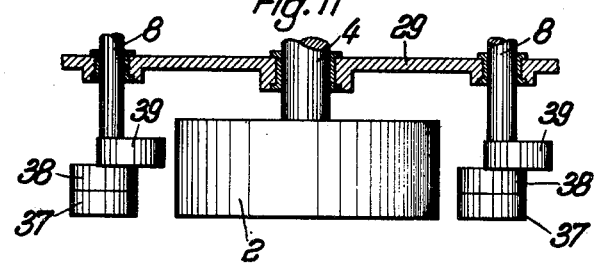

The invention will be described further, by way of example, with reference to the accompanying drawings, in which:

Fig. 1 is a vertical section of one embodiment of mixing and kneading machine constructed in accordance with the invention, Fig. 2 is a horizontal section thereof on the line II—II of Fig. 1, Fig. 3 is a vertical section of a modified embodiment, Fig. 4 is a horizontal section on the line IV—IV of Fig. 3, Fig. 5 is a plan view of a modification of the rotor, Fig. 6 is a side view of the rotor shown in Fig. 5, Fig. 7 is a plan view of another modification of the rotor with the kneading rolls, partially in a horizontal section, Fig. 8 is a vertical section of the rotor and rolls shown on the line VIII—VIII of Fig. 7, Fig. 9 shows another modification of the kneading rolls, Fig. 10 is a simplified representation in plan view of the rotor together with still another form of the kneading rolls, and Fig. 11 a vertical section thereof.

With reference to Figs. 1 and 2, a rotor 2 is arranged concentrically in a generally cylindrical stationary mixing container 1. A rotor shaft 4 mounted in a frame 3 is driven by a motor, mounted upon frame 3, through a belt drive 5.

On either side of rotor 2, are disposed kneading rolls 7 which are mounted eccentrically on their shafts 8.

Shafts 8 are supported in a yoke 9 which can turn on a bushing 10 fixed to the machine frame 3 and which surrounds the rotor shaft 4.

The kneading rolls 7 are driven through spur gears 11 mounted on their shafts 8 and meshing with a spur gear 12 seated on the rotor shaft 4. A pinion 13 is mounted on either kneading roll shaft 8 above the spur gear 11. The two pinions 13 mesh with a ring gear 14 fastened to the bushing 10 and thus fixedly connected with the machine frame 3.

As the ring gear 14 is stationary, the pinions 13 revolve thereabout 14, when the kneading rolls 7 rotate and take the rotary yoke 9 along with them.

Thereby, a planetary rotation of the kneading rolls 7 around the rotor 2 within the annular space between said rotor and container wall is effected.

In Fig. 2 the direction of rotation of the rotor is indicated by the arrow 15; the direction of the planetary rotation of the kneading rolls 7, which is opposite to the direction of rotation of the rotor, by the arrows 16, and the direction of rotation of the kneading rolls 7 which is also opposite to that of the rotor, by arrows 17.

In front of the operating area of the kneading rolls, as seen in the direction of flow of the material, wall scrapers 18 are provided, which are attached to yoke 9 and accordingly turn together with it in the direction of the arrow 16, that is in the sense of the planetary rotation of the kneading rolls.

These wall scrapers scrape the container wall, increase the crowding of the mass of material being treated in front of the kneading rolls and guide the crowded mass to the operating area of the kneading rolls.

To the bottom of the container 1 is fastened a scraper 19 which extends into the space between the rotor and the rotating kneading rolls and stops revolving lumps of the mass so that they can be seized by the kneading rolls.

20 designates a scraping tool also fastened to the bottom of the container and thus stationary, which scrapes the rotor 2.

In the modification as shown in Figs. 3 and 4, the kneading rolls 7 are not rotated with the yoke. Instead, container 21 rotates so that accordingly the same relative motion between the rotor 2, the kneading rolls 7 and the container wall prevails.

The shaft end of container 21 is mounted in a bearing in the housing cover 23. It is driven by a motor shaft 24 through a gear train consisting of the three pairs of bevel gears 25, 26, 27.

Also the rotor shaft 4 is driven by the motor shaft 24 through a pair of bevel gears 28.

The yoke 29, in which the shafts 8 of the kneading rolls 7 are supported, is fastened to the machine frame and is therefore stationary. On the shafts 8, spur gears 11 are again seated, which mesh with the spur gear 12 mounted on the rotor shaft 4 and rotate, therefore, in the direction opposite to that of the rotor 2 as indicated by the arrows 15 and 17 in Fig. 4. Wall scrapers 30 are stationarily fixed on the stationary yoke 29. Due to the rotation of the container, the same crowding effect and the deviation of the flowing mass to the operating area of the kneading rolls 7 prevail as with the arrangement according to Figs. 1 and 2.

Correspondingly, the scraper 19 fastened to the bottom of the container and also rotating together with the rotary container in the direction of arrow 31 produces the same effect as regards the kneading of lumps into the operating area of the kneading rolls as with the embodiment according to Figs. 1 and 2.

A scraper 32 is fastened to the stationary yoke 29.

In order that the kneading rolls mounted eccentrically on their shafts may scrape the entire bottom area within their operating range, the ratio of transmission between the pinions 11 and the central gear 12 is suitably chosen so that the kneading rolls continually change their path of motion in relation to the container bottom. In this modification the scrapers 19 are omitted.

To intensify its effects, the rotor 2 can be provided with beater cams. Figs. 5 and 6 show such a rotor with four beater cams 33 pointing obliquely upwards, that is inclined to the perpendicular, which give the material to be treated an upward motion.

In the embodiment as shown in Figs. 7 and 8, the rotor is composed of discs 34, similar to the blades of a milling cutter, and which are seated on the rotor shaft 4 spaced above each other.

The teeth 35 of the milling discs whip through the gaps of stationary comb bodies 36. These comb bodies are mounted on a part of the machine which, in relation to the kneading rolls, is stationary, namely on the yoke 29 as in the embodiment according to Figs. 3 and 4 or on the yoke 9 as in the embodiment according to Figs. 1 and 2.

With each comb body 36, there is associated a kneading roll 7 which is located in front of the comb body as seen in the direction of rotation of the rotor (arrow 15).

Instead of kneading rolls which are cylindrical or conical over their entire height and mounted eccentrically on their shafts, kneading rolls may also be employed partitioned in their height and composed of several discs staggered relative to each other.

Figs. 10 and 11 show kneading rolls which consist of three discs 37, 38, 39 equally spaced at an angle of 120°. Such a disc roll is balanced, affording quiet running. Furthermore, the blows of impact against the container wall and the rotor, which occur, when the material is compressed, are lighter due to the less height of beating roll surface with a correspondingly higher number of impacts.

A still greater balancing of the impacts is accomplished by means of a screwlike feeding roll 40 according to Fig. 9 which is mounted concentrically on its shaft 8.

I claim:

1. A mixing and kneading machine including a generally cylindrical container, a rotor disposed concentrically in said container and having its shaft parallel to the axis and walls thereof, driving means for effecting relative rotation between said rotor and said container, and kneading rolls symmetrically arranged in the annular space defined between said container and said rotor, and rotated by said driving means in a direction opposite to and with a smaller peripheral speed than that of said rotor, whereby between the axis of each kneading roll and the container wall there takes place a relative movement such that the radial position of said kneading roll with respect to the container wall is constantly changed in the direction opposite to the direction of rotation of the rotor.

2. A machine as set forth in claim 1, further comprising means for rotating the kneading rolls through the annular space between the rotor and the container wall in the opposite direction to the rotation of the rotor.

3. A machine as set forth in claim 1, further comprising means for rotating the container in the same direction as the rotor and the axes of the kneading rolls maintain their position.

4. A mixing and kneading machine including a generally cylindrical container, a rotor disposed concentrically in said container and having its shaft parallel to the axis and walls thereof, driving means for effecting relative rotation between said rotor and said container, a central gear wheel carried on the rotor shaft, kneading rolls symmetrically arranged in the annular space defined between the rotor and the container, and further gear wheels disposed one on each kneading roll shaft so as to mesh with said central gear, whereby between the axis of each kneading roll and the container wall there takes place a relative movement such that the radial position of said kneading roll with respect to the container wall is constantly changed and closely approaches the wall in the direction opposite to the direction of rotation of the rotor.

5. A machine as set forth in claim 4 in which the gear ratio between the central gear wheel and those of the kneading rolls is so chosen that the latter, fixed eccentrically on their shafts, constantly change their path of motion relative to the bottom of the container.

6. A mixing and kneading machine including a frame carrying a generally cylindrical container, a rotor disposed concentrically in said container and having its shaft parallel to the axis and walls thereof, driving means for effecting relative rotation between said rotor and said container, a bush depending from the frame and encircling the rotor shaft, a yoke rotatable around said bush, further shafts journalled in said yoke, kneading rolls mounted on said shafts, and a ring gear fixedly secured to said bush and meshing with pinions arranged one on the shaft of each kneading roll, whereby between the axis of each kneading roll and the container wall there takes place a relative movement such that the radial position of said kneading roll with respect to the container wall is constantly changed in the direction opposite to the direction of rotation of the rotor.

7. A mixing and kneading machine including a frame carrying a generally cylindrical rotatable container, a rotor disposed concentrically in said container and having its shaft parallel to the walls and axis thereof, driving means for effecting rotation of said container relative to said rotor, a yoke fixedly secured to the frame surrounding the rotor shaft, further shafts journalled in said yoke, kneading rolls and pinions carried one each on said further shafts, and a ring gear mounted on the rotor shaft to mesh with said pinions, whereby between the axis of each kneading roll and the container wall there takes place a relative movement such that the radial position of said kneading roll with respect to the container wall is constantly changed in the direction opposite to the direction of rotation of the rotor.

8. A mixing and kneading machine including a frame carrying a generally cylindrical container, a rotor disposed concentrically in said container and having its shaft parallel to the walls and axis thereof, driving means for effecting relative rotation between said rotor and container, a yoke depending from the frame and encircling the rotor shaft, wall scraper means attached to said yoke, further shafts journalled in said yoke, kneading rolls and pinions carried one on each further shaft and a ring gear carried by the rotor shaft to engage with said pinions, whereby between the axis of each kneading roll and the container wall there takes place a relative movement such that the radial position of said kneading roll with respect to the container wall is constantly changed in the direction opposite to the direction of rotation of the rotor.

9. A mixing and kneading machine including a generally cylindrical container, a rotor disposed concentrically in said container and having its shaft parallel to the axis and walls thereof, obliquely upwardly directed beating cams on the peripheral circumference of said rotor inclined relative to the vertical, driving means for effecting relative rotation between said rotor and said container, and kneading rolls arranged in the annular space defined between said container and said rotor, and rotated by said driving means in a direction opposite to and with a smaller peripheral speed than that of said rotor, whereby between the axis of each kneading roll and the container wall there takes place a relative movement such that the radial position of said kneading roll with respect to the container wall is constantly changed in the direction opposite to the direction of rotation of the rotor.

10. A mixing and kneading machine including a generally cylindrical container, a rotor disposed concentrically in said container and having its shaft parallel to the axis and walls thereof, said rotor comprising a plurality of toothed discs similar to milling cutters spaced above one another and attached to the rotor shaft, driving means for effecting relative rotation between said rotor and said container, and kneading rolls arranged in the annular space defined between said container and said rotor, and rotated by said driving means in a direction opposite to and with a smaller peripheral speed than that of said rotor, whereby between the axis of each kneading roll and the container wall there takes place a relative movement such that the radial position of said kneading roll with respect to the container wall is constantly changed in the direction opposite to the direction of rotation of the rotor.

11. A mixing and kneading machine including a generally cylindrical container, a rotor disposed concentrically in said container and having its shaft parallel to the axis and walls thereof, driving means for effecting relative rotation between said rotor and said container, kneading rolls arranged in the annular space defined between said container and said rotor, and scraper means attached to the bottom of the container to project into the space between the rotor and the kneading rolls, said kneading rolls being rotated by said driving means in a direction opposite to and with a smaller peripheral speed than that of said rotor, whereby between the axis of each kneading roll and the container wall there takes place a relative movement such that the radial position of said kneading roll with respect to the container wall is constantly changed in the direction opposite to the direction of rotation of the rotor.

12. A mixing and kneading machine including a generally cylindrical container, a rotor disposed concentrically in said container and having its shaft parallel to the axis and walls thereof, driving means for effecting relative rotation between said rotor and said container, and kneading rolls comprising a plurality of discs fixed eccentrically on the shaft and staggered relative to each other and arranged in the annular space defined between said container and said rotor, and rotated by said driving means in a direction opposite to and with a smaller peripheral speed than that of said rotor, whereby between the axis of each kneading roll and the container wall there takes place a relative movement such that the radial position of said kneading roll with respect to the container wall is constantly changed in the direction opposite to the direction of rotation of the rotor.

13. A mixing and kneading machine including a generally cylindrical container, a rotor disposed concentrically in said container and having its shaft parallel to the axis and walls thereof, driving means for effecting relative rotation between said rotor and said container, and spirally-shaped kneading rolls arranged in the annular space defined between said container and said rotor, and rotated by said driving means in a direction opposite to and with a smaller peripheral speed than that of said rotor, whereby between the axis of each kneading roll and the container wall there takes place a relative movement such that the radial position of said kneading roll with respect to the container wall is constantly changed in the direction opposite to the direction of rotation of the rotor.

References Cited in the file of this patent
UNITED STATES PATENTS

| Number | Name | Date |
|---|---|---|
| 230,856 | Borthwick | Aug. 10, 1880 |
| 280,025 | Fiederlein | June 26, 1883 |
| 370,335 | Hunter | Sept. 20, 1887 |
| 856,295 | Prindle | June 11, 1907 |
| 2,003,829 | Gilbert et al. | June 4, 1935 |
| 2,184,225 | McDuffee et al. | Dec. 19, 1939 |
| 2,592,334 | Reiffen | Apr. 8, 1952 |
| 2,622,856 | Simon | Dec. 23, 1952 |
| 2,670,188 | Erdmenger | Feb. 23, 1954 |
| 2,721,359 | Morgan | Oct. 25, 1955 |